United States Patent
Fields, Jr. et al.

(10) Patent No.: US 7,484,131 B2
(45) Date of Patent: Jan. 27, 2009

(54) SYSTEM AND METHOD FOR RECOVERING FROM A HANG CONDITION IN A DATA PROCESSING SYSTEM

(75) Inventors: James S. Fields, Jr., Austin, TX (US); Benjiman L. Goodman, Cedar Park, TX (US); Praveen S. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 11/225,639

(22) Filed: Sep. 13, 2005

(65) Prior Publication Data

US 2007/0061630 A1    Mar. 15, 2007

(51) Int. Cl.
    *G06F 11/00* (2006.01)
(52) U.S. Cl. .......................................... 714/47; 714/11
(58) Field of Classification Search .................. 714/11, 714/43, 47
    See application file for complete search history.

(56) References Cited

U.S. PATENT DOCUMENTS

| | | | |
|---|---|---|---|
| 6,128,677 A * | 10/2000 | Miller et al. .................. 710/40 |
| 6,438,709 B2 * | 8/2002 | Poisner .......................... 714/23 |
| 6,453,429 B1 * | 9/2002 | Sadana .......................... 714/43 |
| 6,543,002 B1 * | 4/2003 | Kahle et al. .................... 714/10 |
| 6,636,909 B1 * | 10/2003 | Kahn et al. ..................... 710/60 |
| 6,691,191 B1 * | 2/2004 | Kobayashi et al. ........... 710/107 |
| 7,162,666 B2 * | 1/2007 | Bono ............................. 714/51 |
| 7,219,264 B2 * | 5/2007 | Pail et al. ....................... 714/23 |
| 2005/0081115 A1 * | 4/2005 | Cheng et al. ................... 714/47 |
| 2006/0005082 A1 * | 1/2006 | Fossum et al. ................. 714/42 |

* cited by examiner

*Primary Examiner*—Marc Duncan
(74) *Attorney, Agent, or Firm*—Casimer K. Salys; Dillon & Yudell LLP

(57) ABSTRACT

A data processing system, method, and computer-usable medium for recovering from a hang condition in a data processing system. The data processing system includes a collection of coupled processing units. The processing units include a collection of processing unit components such as, two or more processing cores, and a cache array, a processor core master, a cache snooper, and a local hang manager. The local hang manager determines whether at least one component out of the collection of processing unit components has entered into a hang condition. If the local hang manager determines at least one component has entered into a hang condition, a throttling manager throttles the performance of the processing unit in an attempt to break the at least one component out of the hang condition.

6 Claims, 5 Drawing Sheets

SYSTEM AND METHOD FOR RECOVERING FROM A HANG CONDITION IN A DATA PROCESSING SYSTEM

BACKGROUND OF THE INVENTION

1. Technical Field

The present invention relates in general to the field of data processing systems. More particularly, the present invention relates to controlling the data processing flow in data processing systems. Still more particularly, the present invention relates to a system and method for recovering from a hang condition in a data processing system.

2. Description of the Related Art

One of the greatest challenges of designing multi-processor (MP) data processing systems is to determine how to efficiently synchronize and arbitrate access to resources, such as system memory and cache memory. Sharing resources eliminates the need for a resource or the data or instructions stored therein to be duplicated for each processing unit or other requestor of access to the resource.

As appreciated by those with skill in the art, one common solution utilized to share resources in an MP data processing system involves a blocking algorithm. Typically, a lock is utilized to block a first requestor from accessing shared resource (e.g., a system memory, a cache line, etc.) when a second requestor is accessing the shared resource. When a first requestor is waiting for access to the shared resource, the first requestor (e.g., processor core, processor core masters, cache snoopers, etc.) is described as being in a "hang condition".

Constantly retrying access requests to a temporarily inaccessible shared resource consumes power and system resources that could otherwise be used to perform useful work. Therefore, there is a need for a system and method for recovering from a hang condition in a data processing system.

SUMMARY OF THE INVENTION

The present invention includes, but is not limited to, a data processing system, method, and computer-readable medium for recovering from a hang condition in a data processing system. The data processing system includes a collection of coupled processing units. The processing units include a collection of processing unit components such as, two or more processing cores, and a cache array, a processor core master, a cache snooper, and a local hang manager, all coupled by an interconnect.

The processor core master is coupled to at least one processing core among the two or more processing cores and services data access requests issued by the at least one processing core. The cache snooper is coupled to the cache array and services other data access requests. The processor core master and cache snooper contend for access to the cache array. The local hang manager determines whether at least one component out of the collection of processing unit components has entered into a hang condition. If the local hang manager determines at least one component has entered into a hang condition, a throttling manager throttles the performance of the processing unit in an attempt to break the at least one component out of the hang condition. The performance throttling is achieved by varying a data access request issuance rate of the collection of processing unit components.

A master hang manager (prompted by a periodic hang pulse from a pulse generator) sends hang packets to local hang managers within the data processing system to prompt the local hang manager to determine if any processing unit component has entered into a hang condition. The pulse generator also generates an early exit pulse to prompt the master hang manager to send out another hang packet to local hang managers to determine if the at least one component among the collection of processing unit components has exited the hang condition.

The above-mentioned features, as well as additional objectives, features, and advantages of the present invention will become apparent in the following detailed description.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
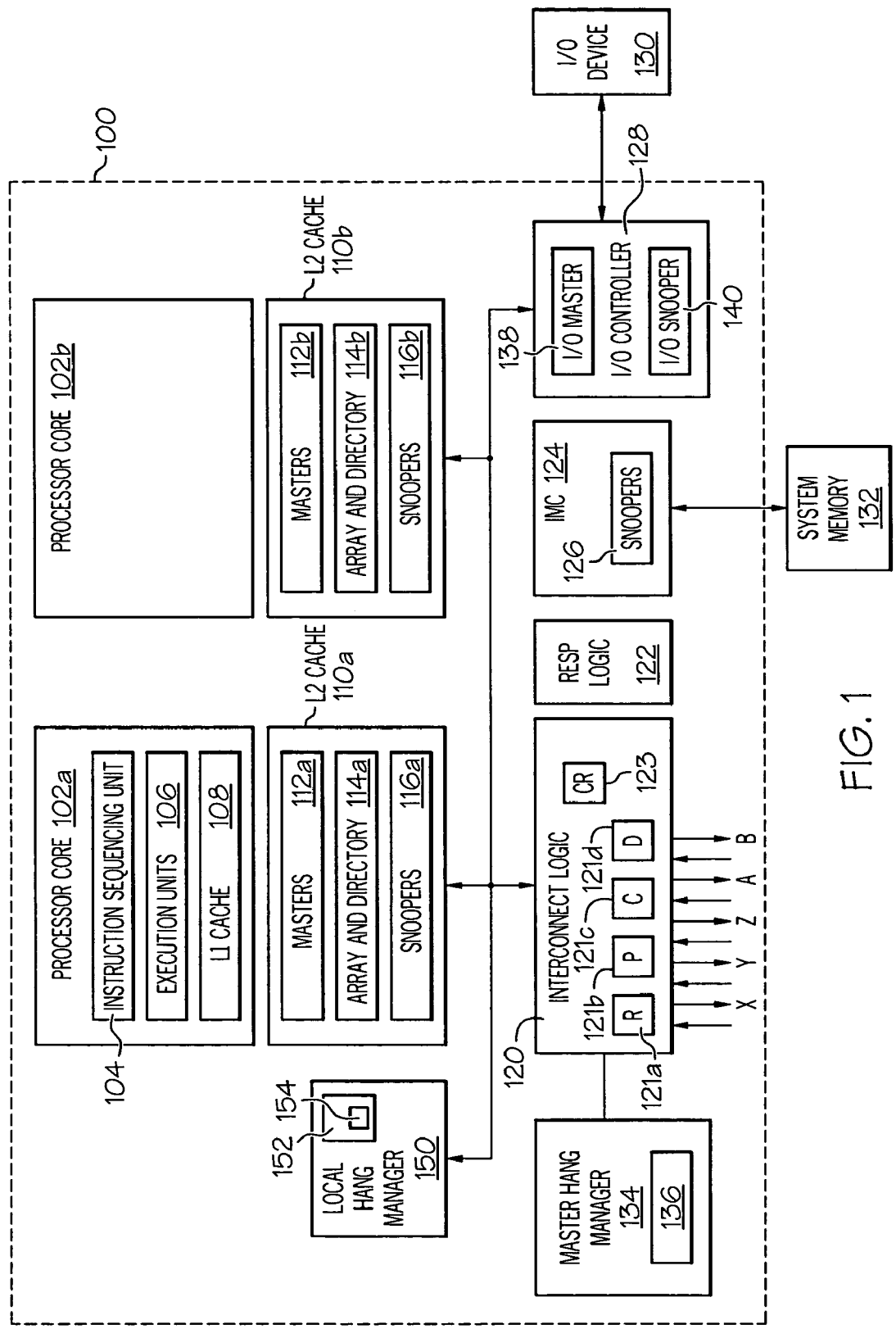
FIG. 1 is an exemplary processing unit in which a preferred embodiment of the present invention may be implemented.

With reference now to the figures, and, in particular, with reference to FIG. 1, there is illustrated a high-level block diagram of an exemplary embodiment of a processing unit 100 in accordance with the present invention. In the depicted embodiment, processing unit 100 is a single integrated circuit including two processor cores 102a, 102b for independently processing instructions and data. Each processor core 102 includes at least and instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block.

The operation of each processor core 102a, 102b is supported by a multi-level volatile memory hierarchy having at its lowest level one or more shared system memories 132 (only one of which is show in FIG. 1) and, at its upper levels, one or more levels of cache memory. As depicted, processing unit 100 includes an integrated memory controller (IMC) 124 that controls read and write access to a system memory 132 in response to requests received from processor cores 102a, 102b and operations snooped on an interconnect fabric by snoopers 126.

In the illustrative embodiment, the cache memory hierarchy of processing unit 100 includes a store-through level one (L1) cache 108 within each processor core 102a, 102b and a level two (L2) cache 110a, 110b coupled to each processor core 102a and 102b. Each L2 cache 110 includes an L2 array and directory 114, processor core masters 112 and cache snoopers 116. Processor core masters 112 initiate transactions on the interconnect fabric and access L2 array and directory 114 in response to memory access (and other) requests received from the associated processor cores 102. Cache snoopers 116 detect operations on the interconnect fabric, provide appropriate responses, and perform any accesses to L2 array and directory 114 required by the operations. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents of the upper levels of cache.

As further shown in FIG. 1, processing unit 100 includes integrated interconnect logic 120 by which processing unit 100 may be coupled to the interconnect fabric as part of a larger data processing system. In the depicted embodiment, interconnect logic 120 supports an arbitrary number t1 first tier interconnect links, which in this case include in-bound and out-bound X, Y, and Z links. Interconnect logic 120 further supports an arbitrary number t2 second tier links, designated in FIG. 1 as in-bound and out-bound A and B links. With these first and second tier links, each processing unit 100 may be coupled for bi-directional communication t1+t2 (in this case, five) other processing units 100. Interconnect logic 120 includes request logic 121a, partial response logic 121b, combined response logic 121c, and data logic 121d for processing and forwarding information during different phases of operations. In addition, interconnect logic 120 includes a configuration register 123 including a plurality of mode bits utilized to configure processing unit 100.

Each processing unit 100 further includes an instance of response logic 122, which implements a portion of distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 also includes an I/O master 138, for initiating transactions on the interconnect fabric in response to memory access (and other) requests received from I/O device 130. I/O snooper 140, also included in I/O controller 128, detect operations on the interconnect fabric, provide appropriate responses, and perform any I/O accesses required by the operations.

Figure 2:
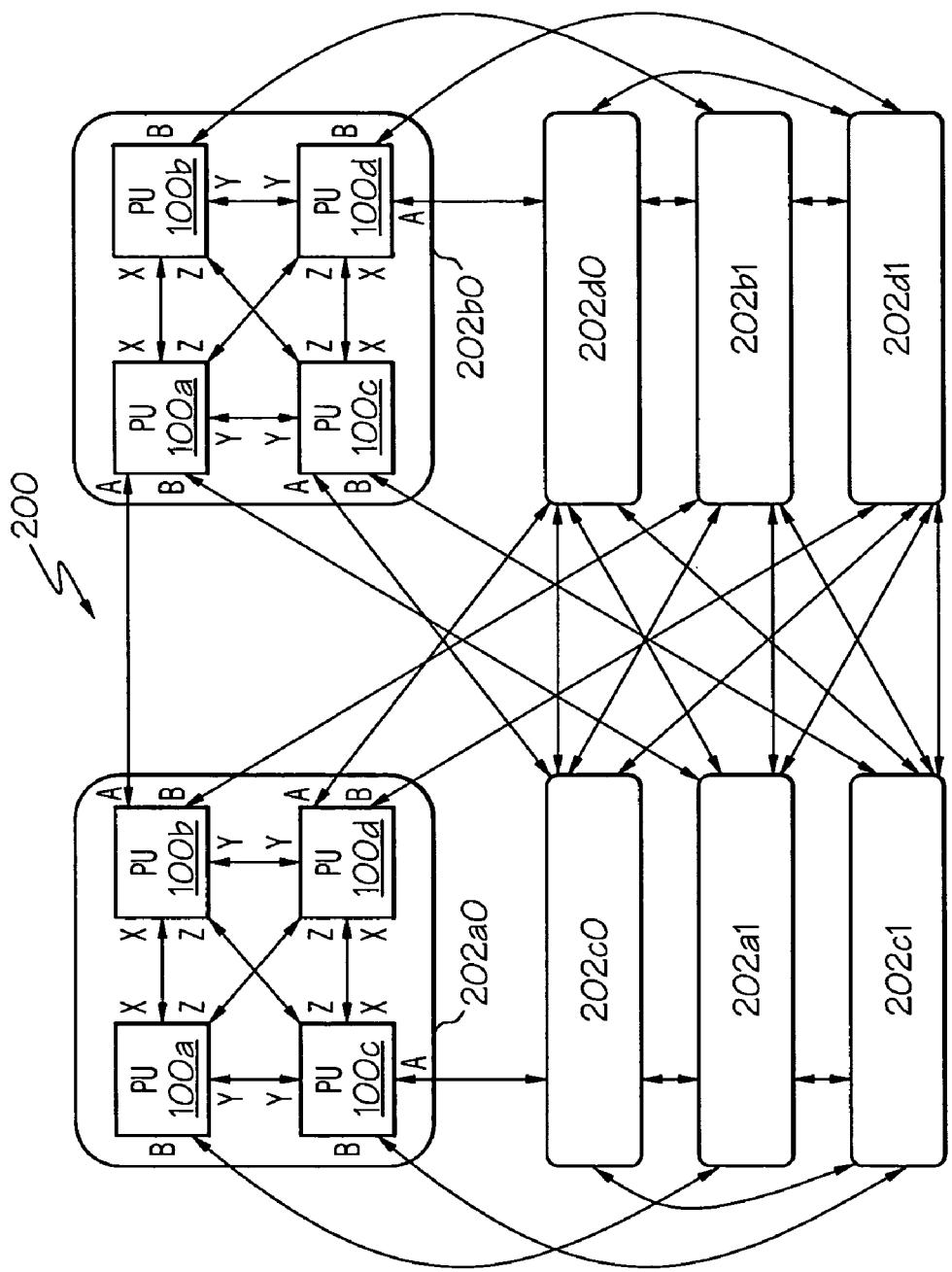
FIG. 2 is an exemplary data processing unit formed of multiple processing units (of FIG. 1) in which a preferred embodiment of the present invention may be implemented.
Figure 4A:
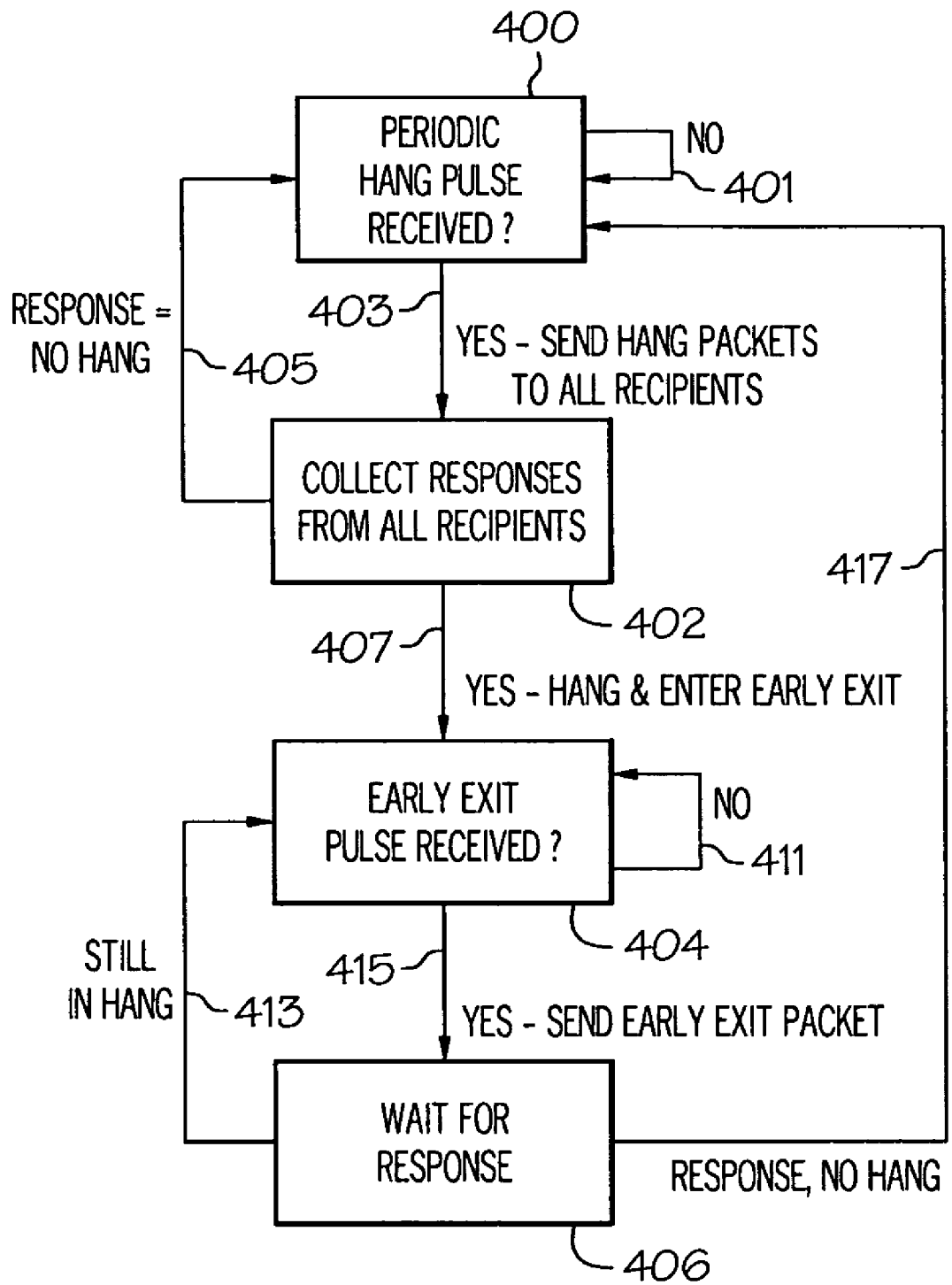
FIG. 4A is a state diagram illustrating the operation of an exemplary master hang manager in accordance with a preferred embodiment of the present invention.
Figure 4B:
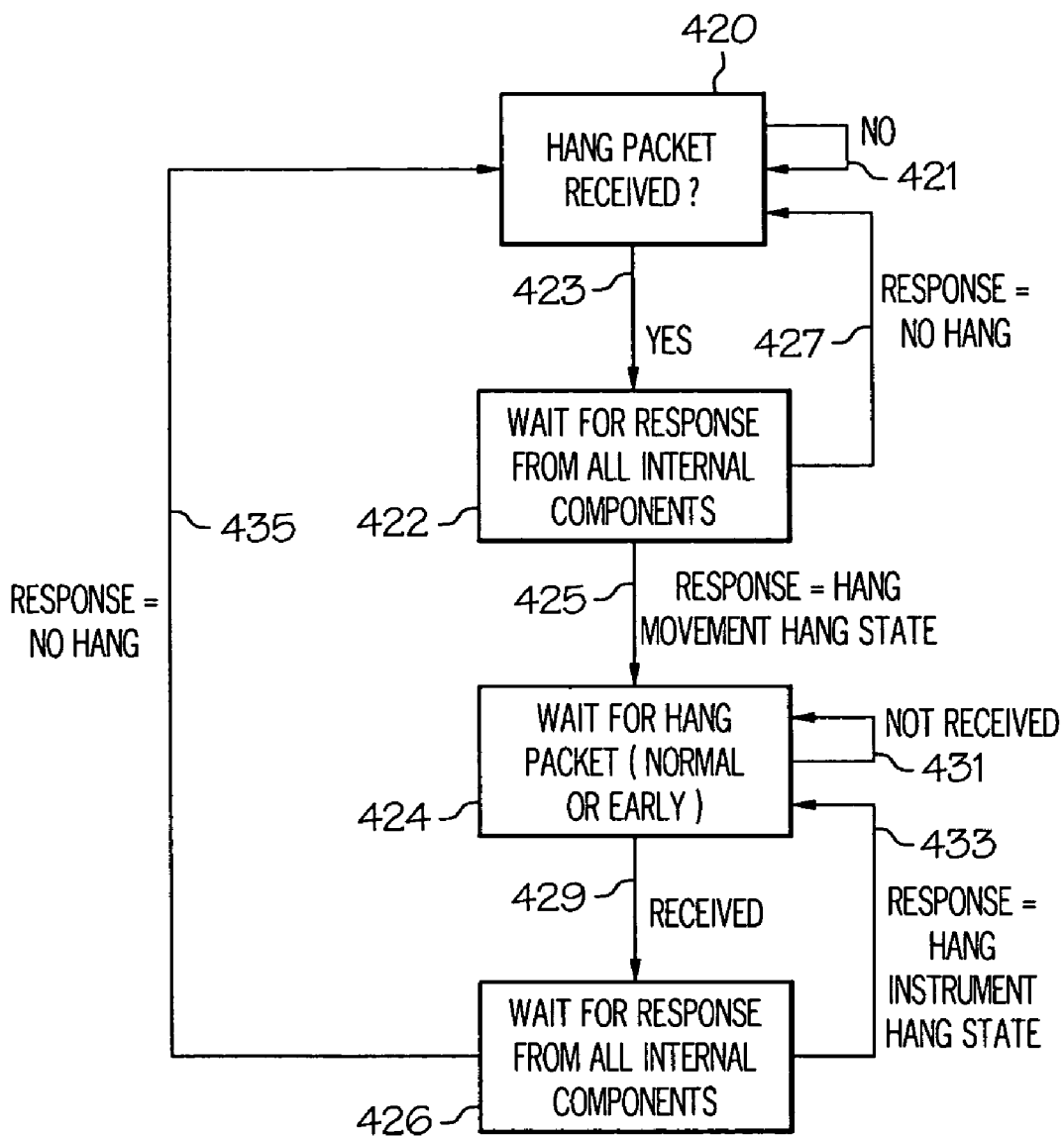
FIG. 4B is a state diagram depicting the interaction between an exemplary master hang manager, an exemplary local hang manager, and internal processing unit components coupled to the local hang manager according to a preferred embodiment of the present invention.

Coupled to interconnect logic 120 is a master hang manager, discussed in more detail herein in conjunction with FIGS. 2, 4A-4B. Master hang manager 134 also includes a pulse generator 136, which generates a periodic hang pulse and an early exit pulse, both discussed herein in more detail in conjunction with FIGS. 4A-4B. Also coupled to interconnect logic 120 via processing unit interconnect 142 is local hang manager 150. Local hang manager 150 also includes throttling manager 152 and hang state counter 154, both discussed herein in more detail.

In a preferred embodiment of the present invention, master hang manager 134 periodically (as prompted by pulse generator 136) sends a hang packet to each processing unit 100, and optimally, other data processing system components such as system memory 132 and/or I/O device 130. The hang packet represents a query to the recipient local hang manager 150 within processing unit 100 concerning whether any components within processing unit 100 has entered into a hang condition.

Referring now to FIG. 2, there is depicted a block diagram of an exemplary embodiment of a data processing system 200 formed of multiple processing units 100 in accordance with the present invention. As shown, data processing system 200 includes eight processing nodes 202a0-202d0 and 202a1-202d1, which in the depicted embodiment, are each realized as a multi-chip module (MCM) comprising a package containing four processing units 100. The processing units 100 within each processing node 202 are coupled for point-to-point communication by the processing units' X, Y, and Z links, as shown. Each processing unit 100 may be further coupled to processing units 100 in two different processing nodes 202 for point-to-point communication by the processing units' A and B links. Although illustrated in FIG. 2 with a double-headed arrow, it should be understood that each pair of X, Y, Z, A and B links are preferably (but not necessarily) implemented as two uni-directional links, rather than as a bi-directional link. Also, processing unit 100a includes master hang manager 134, which sends hang packets to other processing units within data processing system 200 to determine whether any of processing units 100 has entered into a hang condition. In another embodiment of the present invention, each processing node or processing unit 100 may include a master hang manager 134, depending on the desired scope of broadcast of hang packets and response.

It should be appreciated that the depicted topology is representative but not exhaustive of data processing system topologies embodying the present invention and that other topologies are possible. In such alternative topologies, for example, the number of first tier and second tier links coupled to each processing unit 100 can be an arbitrary number, and the number of processing nodes 202 within each tier need not equal the number of processing units 100 per processing node 100.

Even though fully connected in the manner shown in FIG. 2, all processing nodes 202 need not communicate each operation to all other processing nodes 202. In particular, as noted above, processing units 100 may broadcast operations with a scope limited to their processing node 202 or with a larger scope, such as a system-wide scope including all processing nodes 202.

Figure 3:
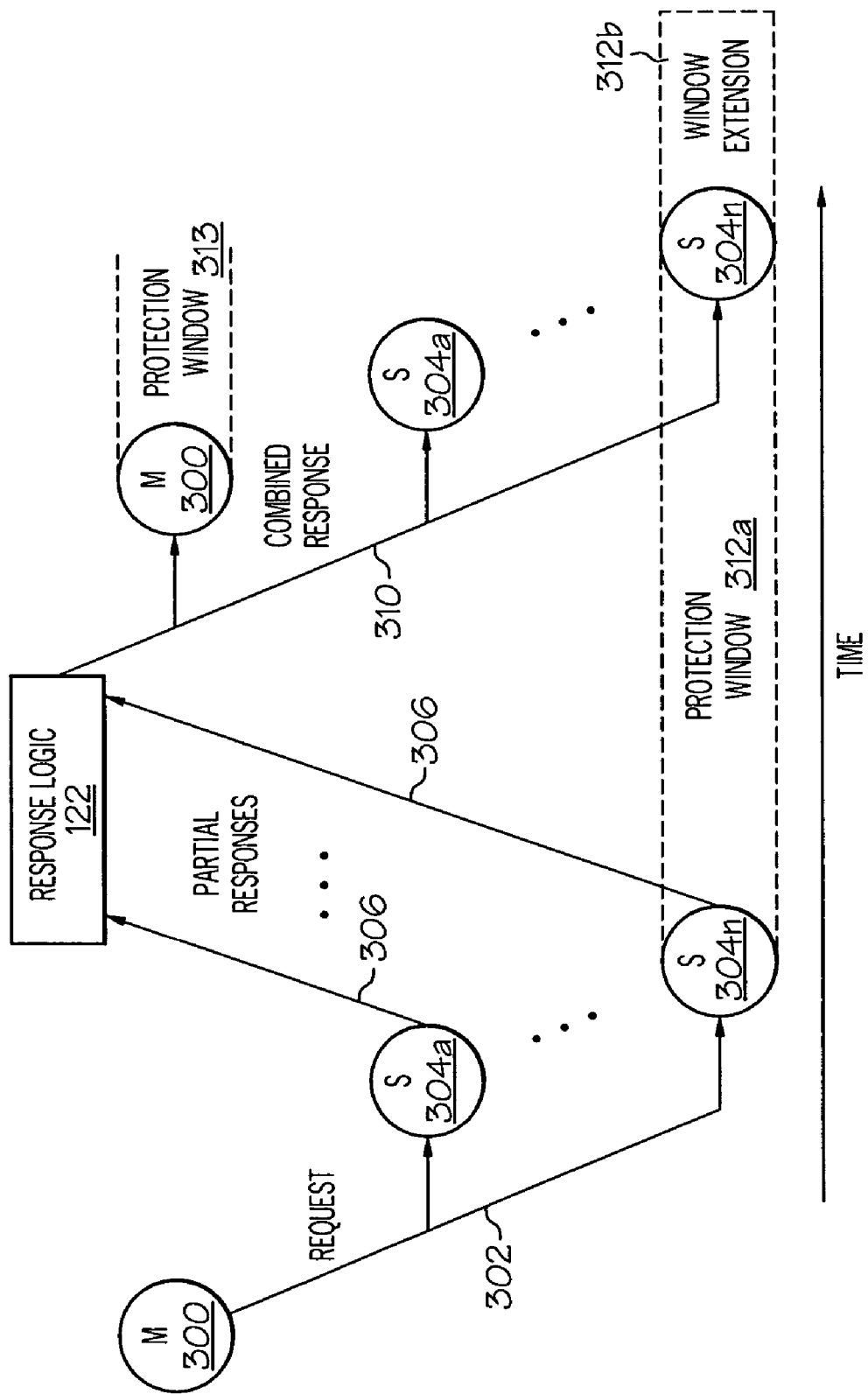
FIG. 3 is a time-space diagram depicting an exemplary operation on the interconnect fabric of the data processing system depicted in FIG. 2 in accordance with a preferred embodiment of the present invention.

Referring now to FIG. 3, there is depicted a time-space diagram of an exemplary operation on the interconnect fabric of data processing system 200 of FIG. 2. The operation begins when a master 300 (e.g., a processor core master 112 of an L2 cache 110 or a I/O master 138) issues a request 302 on the interconnect fabric. Request 302 preferably includes at least a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |

TABLE I-continued

| Request | Description |
| --- | --- |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 302 is received by snoopers 304, for example, cache snoopers 116 of L2 caches 110 and snoopers 126 of IMCs 124, distributed throughout data processing system 200. In general, with some exceptions, cache snoopers 116 in the same L2 cache 110 as the processor core master 112 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response 306 representing the response of at least that snooper 304 to request 302. A snooper 126 within an IMC 124 determines the partial response 306 to provide based, for example, upon whether the snooper 126 is responsible for the request address and whether it has resources available to service the request. A cache snooper 116 of an L2 cache 110 may determine its partial response 306 based on, for example, the availability of its L2 cache directory 114, the availability of a snoop logic instance within cache snooper 116 to handle the request, and the coherency state associated with the request address in L2 cache directory 114.

The partial responses 306 of snoopers 304 are logically combined either in stages or all at once by one or more instances of response logic 122 to determine a combined response (CR) 310 to request 302. In one preferred embodiment, which will be assumed hereinafter, the instance of response logic 122 responsible for generating combined response 310 is located in the processing unit 100 containing the master 300 that issued request 302. Response logic 122 provides combined response 310 to master 300 and snoopers 304 via the interconnect fabric to indicate the response (e.g., success, failure, retry, etc.) to request 302. If the CR 310 indicates success of request 302, CR 310 may indicate, for example, a data source for a requested memory block, a cache state in which the requested memory block is to be cached by master 300, and whether "cleanup" operations invalidating the requested memory block in one or more L2 caches 110 are required.

In response to receipt of combined response 310, one or more of master 300 and snoopers 304 typically perform one or more operations in order to service request 302. These operations may include supplying data to master 300, invalidating or otherwise updating the coherency state of data cached in one or more L2 caches 110, performing castout operations, writing back data to a system memory 132, etc. If required by request 302, a requested or target memory block may be transmitted to or from master 300 before or after the generation of combined response 310 by response logic 122.

In the following description, the partial response 306 of a snooper 304 to a request 302 and the operations performed by the snooper 304 in response to the request 302 and/or its combined response 310 will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the L2 cache directory 114 of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of ownership of the requested memory block to master 300 during a protection window 312a that extends from the time that snooper 304n determines its partial response 306 until snooper 304n receives combined response 310 and during a subsequent window extension 312b extending a programmable time beyond receipt by snooper 304n of combined response 310. During protection window 312a and window extension 312b, snooper 304n protects the transfer of ownership by providing partial responses 306 to other requests specifying the same request address that prevent other masters from obtaining ownership (e.g., a retry partial response) until ownership has been successfully transferred to master 300. Master 300 likewise initiates a protection window 313 to protect its ownership of the memory block requested in request 302 following receipt of combined response 310.

Because snoopers 304 all have limited resources for handling the CPU and I/O requests described above, several different levels of partial responses and corresponding CRs are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that is the LPC for the memory block, but is unable to currently service the request. Similarly, a cache snooper 116 in an L2 cache 110 may require an available instance of snoop logic and access to L2 cache directory 114 in order to handle a request. Absence of access to either (or both) of these resources results in a partial response (and corresponding CR) signaling an inability to service the request due to absence of a required resource.

Referring again to FIGS. 1 and 2, master hang manager 134 queries data processing system 200 for any processing unit 100 or other components that may have entered into a hang condition. In one embodiment, master hang manager 134 queries data processing system 200 for components in a hang condition by broadcasting hang packets as requests 302 on the interconnect fabric.

In an exemplary operating scenario, processor core 102a may require access to a specific memory block stored within L2 array and directory 144a. To access the memory block, processor core 102a issues an access request to processor core masters 112a, which seek to service the request. However, if the requested memory block is locked by cache snoopers 116a (which are accessing the specific cache line in response to an access request from another processor core 102), processor core masters 112a will be unable to access the memory block within L2 array and directory 114a. When the local hang manager 150 within the processing unit 100 receives a hang packet from master hang manager 134, local hang manager 150 queries all components (e.g., processor core masters 112a, cache snoopers 116a, etc.) within its processing unit 100 to determine if any component has entered into a hang condition. In this example, processor core masters 112a would report a hang condition to local hang manager 150 because the access request to the specific memory block is blocked by cache snoopers 116a. Local hang manager 150 will determine that a component to have entered into a hang condition by comparing to a predetermined threshold a number of times the component has received a retry signal in response to a data access request issued by the component.

In response to the reported hang condition, local hang manager 150 increments a hang state in hang state counter 154, which prompts throttling manager 152 to throttle the performance of processing unit 100 by varying the request issuance rates of processor core masters 112a and cache snoopers 116a. Varying the request issuance rates attempts to break the "live lock" between processor core masters 112a and cache snoopers 116a so that their access requests for the specific memory block will no longer coincide. Local hang manager 150 also sends a notification to master hang manager 134 indicating that processor core masters 112a have entered into a hang condition.

In response to receiving notification that processor core masters 112a have entered into a hang condition, master hang manager 134 sends a second hang packet (normal or early exit, discussed herein in more detail in conjunction with FIGS. 4A and 4B) that instructs local hang manager 134 to increment the value of hang state counter 154 and further throttle the performance of processing unit 100 via throttling manager 152 in an attempt to break the hang condition of processor core masters 112a. On receipt of the second hang packet, local hang manager 150 checks the states of all the components in processing unit 100 again. If processor core masters 112a remain in a hang condition, local hang manager 134 to increments the value of hang state counter 154 and further throttles the performance of processing unit 100 via throttling manager 152 in an attempt to break the hang condition of processor core masters 112a. This process continues until processor core masters 112a no longer reports a hang condition.

FIG. 4A is a state diagram illustrating the operation of an exemplary master hang manager 134 according to a preferred embodiment of the present invention. The process begins at state 400, which illustrates master hang manager 134 determining if a periodic hang pulse has been received from pulse generator 136. If a periodic hang pulse has not been received, the process iterates at state 400, as depicted by arrow 401.

If the periodic hang pulse has been received, master hang manager 134 sends a hang packet to all local hang managers 150 within data processing system 200, as illustrated by arrow 403. The process transitions to state 402, which depicts master hang manager 134 collecting responses from all local hang managers 150. If master hang manager 134 determines from a combined response from all local hang managers 150 that there is not a hang in data processing system 200, as depicted by arrow 405, the process returns to state 400.

If master hang manager 134 determines from a combined response from all local hang managers 150 that there is a hang in data processing system 200, as depicted by arrow 407, master hang manager 134 enters an early exit state, which includes waiting for an early exit pulse from pulse generator 136, as illustrated in state 404. An early exit pulse is preferably generated more frequently (e.g., has a shorter period) than the periodic hang pulse. The early exit pulse enables master hang manager 134 to attempt to break a processing unit 100 (or component thereof) out of a hang condition by sending an early exit packet instructing local hang manager 150 of a processing unit 100 that has entered into a hang condition to throttle the performance of the relevant components (e.g., from the earlier example, processor core masters 112a and cache snoopers 116a) by varying the request issuances rates (arrow 415).

The process transitions to state 406, which illustrates master hang manager 406 waiting for a response from the local hang manager 150 of the processing unit 100 experiencing the hang condition. If the response from local hang manager 150 indicates the hang condition has been resolved (arrow 417), the process transitions back to state 400 and continues in an iterative fashion. However, if the response from local hang manager 150 is that processing unit 100 still remains in a hang condition (arrow 413), the process returns to state 404.

FIG. 4B is a state diagram illustrating the interaction between master hang manager 134, local hang manager 150, and internal components coupled to local hang manager 150 in processing unit 100 according to a preferred embodiment of the present invention.

The process begins at state 420, which illustrates local hang manager 150 determining whether a hang packet has been received from master hang manager 134. If a hang packet from master hang manager 134 has not been received, the process iterates at state 420, as depicted by arrow 421. If a hang packet from master hang manager 134 has been received, the process transitions to state 422, as illustrated by arrow 423, wherein local hang manager 150 sends out a query to determine if components within processing unit 100 have entered into a hang condition. State 422 depicts local hang manager 150 waiting for a response (hang or no hang) from components within processing unit 100. If none of the components (e.g., processor core masters 112a, cache snoopers 116a, etc.) have entered into a hang condition, the process transitions back to state 420, as illustrated by arrow 427. If at least one component has entered into a hang condition, local hang manager 150 increments the hang state in hang state counter 154 and begins data throttling via data throttling manager 152 (arrow 425), and proceeds to state 424.

State 424 illustrates local hang manager 150 waiting for a normal or early hang packet from master hang manager 134. This normal or early hang packet enables master hang manager 134 to instruct local hang manager 150 to increment the hang state in hang state counter 154, which increases the amount of data throttling applied by data throttling manager 152 in an attempt to break to processing unit 100 out of the hang condition. If the normal or early hang packet from master hang manager 134 has not been received (arrow 431), the process iterates at state 424.

However, if the normal or early hang packet from master hang manager 134 has been received (arrow 429), the process transitions to state 426, which illustrates local hang manager 150 waiting for responses (hang or no hang) from the components within processing unit 100. If a component within processing unit 100 remains in a hang state, local hang manager 150 sends a notification to master hang manager 134 that a component remains in a hang condition and increments the hang state in hang state counter 154, which results in data throttling manager 152 increasing the rate of data throttling (arrow 433). The process then iterates at state 426. If no components within processing unit 100 remain in a hang condition, local hang manager 150 sends a notification to master hang manager 134 that indicates that none of the components within processing unit 100 remains in a hang condition. The process returns to state 420 and proceeds in an iterative fashion.

As has been described, the present invention includes, but is not limited to, a system and method for recovering from a hang condition in a data processing system. The data processing system includes a collection of coupled processing units. The processing units include a collection of processing unit components such as, two or more processing cores, and a cache array, a processor core master, a cache snooper, and a local hang manager, all coupled by an interconnect.

The processor core master is coupled to at least one processing core among the two or more processing cores and services data access requests issued by the at least one processing core. The cache snooper is coupled to the cache array and services other data access requests. The processor core master and cache snooper contend for access to the cache array. The local hang manager determines whether at least one component out of the collection of processing unit components has entered into a hang condition. If the local hang manager determines at least one component has entered into a hang condition, a throttling manager throttles the performance of the processing unit in an attempt to break the at least one component out of the hang condition. The performance throttling is achieved by varying a data access request issuance rate of the collection of processing unit components.

A master hang manager (prompted by a periodic hang pulse from a pulse generator) sends hang packets to local hang managers within the data processing system to prompt the local hang manager to determine if any processing unit component has entered into a hang condition. The pulse generator also generates an early exit pulse to prompt the master hang manager to send out another hang packet to local hang managers to determine if the at least one component among the collection of processing unit components has exited the hang condition.

Also, it should be understood that at least some aspects of the present invention may be alternatively implemented in a computer-readable medium that stores a program product. Programs defining functions on the present invention can be delivered to a data storage system or a computer system via a variety of signal-bearing media, which include, without limitation, non-writable storage media (e.g., CD-ROM), writable storage media (e.g., floppy diskette, hard disk drive, read/write CD-ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method of data processing in a data processing system including at least one processing unit, said method comprising:
    a master hang manager issuing at least one hang packet to a local hang manager;
    in response to receiving said at least one hang packet, the local hang manager querying a plurality of components within a processing unit to determine if at least one component among said plurality of components has entered into a hang condition; and
    in response to determining said at least one component among said plurality of components has entered into said hang condition, throttling down processing unit performance.

2. The method according to claim 1, wherein said throttling down processing unit performance further comprises:
    varying a data access request issuance rate of said at least one processing unit.

3. The method according to claim 1, further comprising:
    determining whether said at least one component has entered into said hang condition by comparing to a predetermined threshold a number of times said at least one component has received a retry signal in response to a data access request issued by said at least one component.

4. The method according to claim 1, further comprising:
    generating a periodic hang pulse to a master hang manager to prompt said master hang manager to send said at least one hang packet to said local hang manager to determine if at least one component among said plurality of components has entered into said hang condition, wherein said periodic hang pulse has a first period length.

5. The method according to claim 1, further comprising:
    generating an early exit pulse to said master hang manager to prompt said master hang manager to send said at least one hang packet to said local hang manager to determine if said at least one component among said plurality of components has exited said hang condition, wherein said early exit pulse has a second period, wherein said second period is shorter than said first period.

6. The method according to claim 1, wherein said throttling further comprises:
    varying a data access request issuance rate of said plurality of components.

* * * * *